Figure 3:
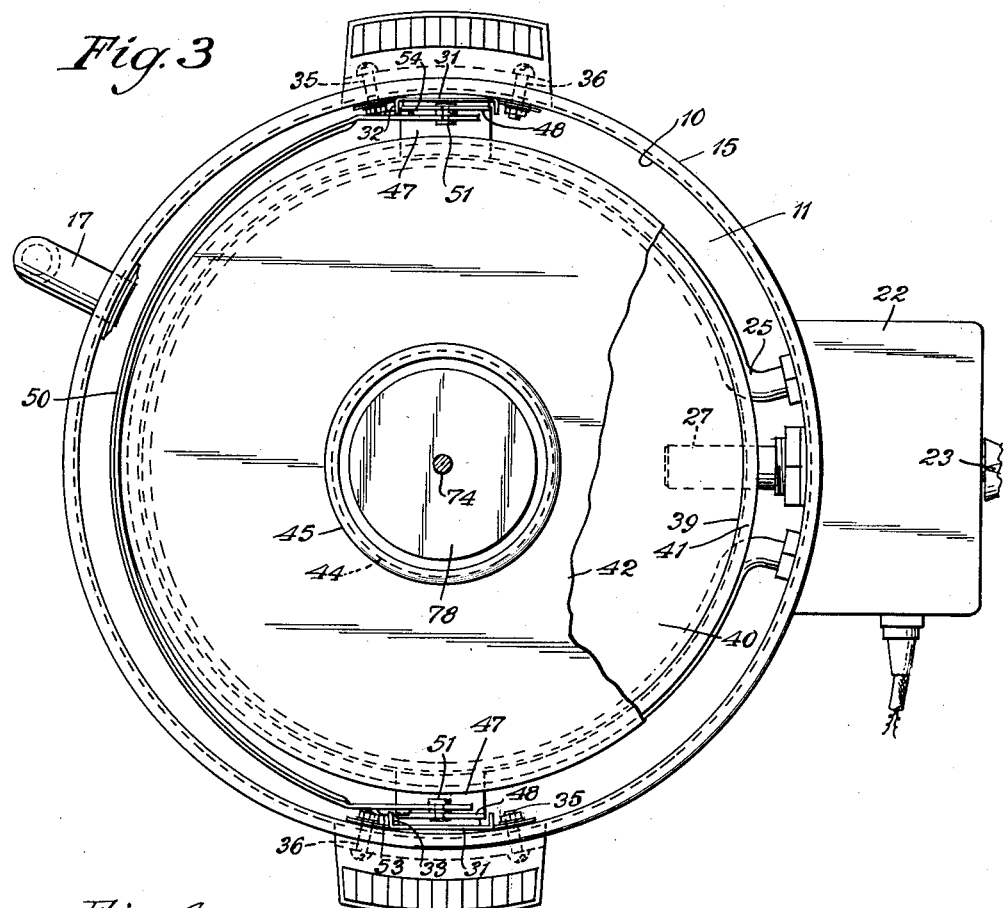

Aug. 19, 1952 H. B. SAUNDERS 2,607,566
PASTEURIZER
Filed Oct. 21, 1949 2 SHEETS—SHEET 1
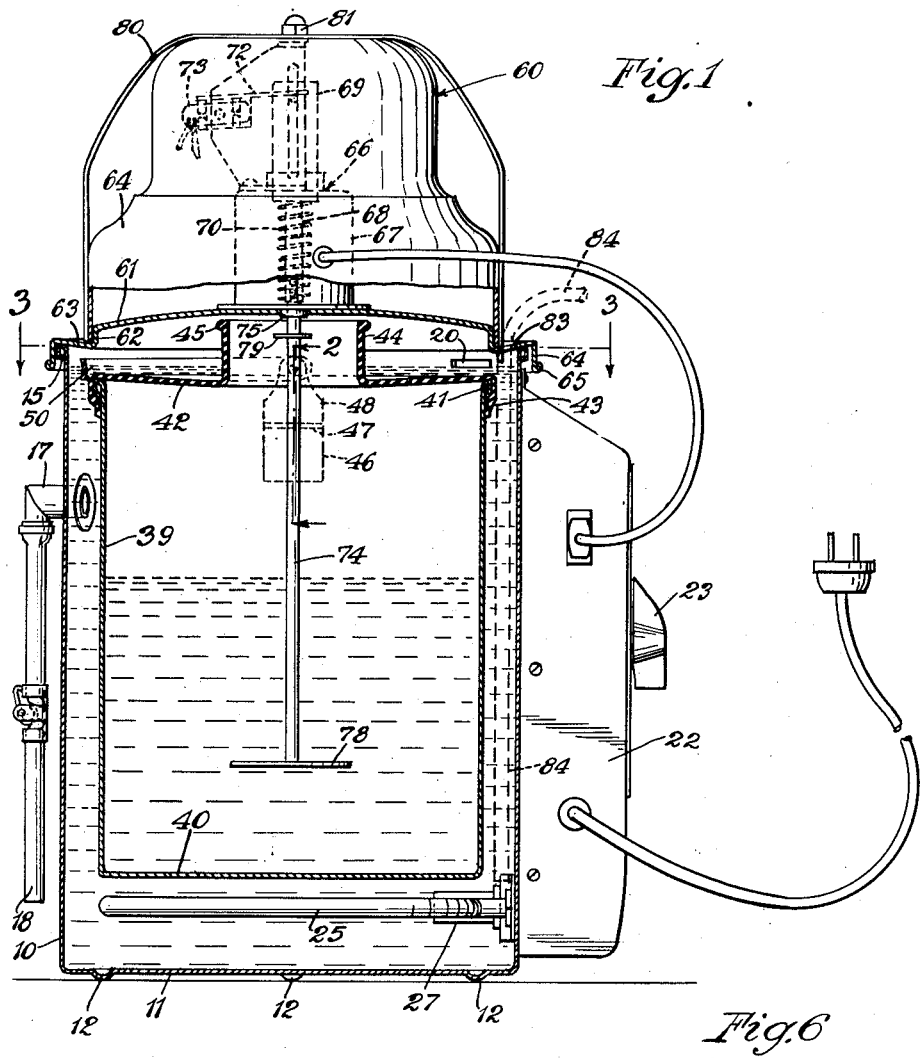
Fig.1
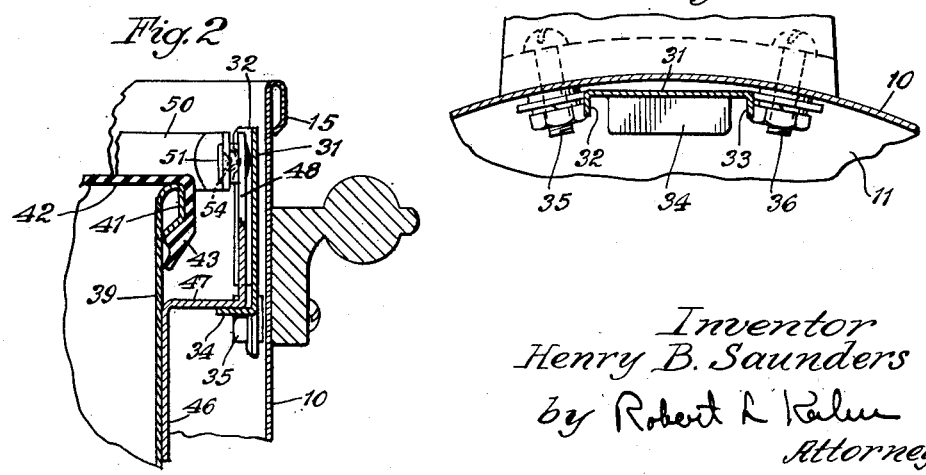
Fig.2
Fig.6
Inventor
Henry B. Saunders
by Robert L. Kahn
Attorney.

Aug. 19, 1952 — H. B. SAUNDERS — 2,607,566
PASTEURIZER
Filed Oct. 21, 1949 — 2 SHEETS—SHEET 2

Inventor
Henry B. Saunders
by Robert C. Kahn
Attorney.

Patented Aug. 19, 1952

2,607,566

UNITED STATES PATENT OFFICE 2,607,566

PASTEURIZER

Henry B. Saunders, Warrenville, Ill., assignor to Guard-It Manufacturing Company, Chicago, Ill., a corporation of Illinois Application October 21, 1949, Serial No. 122,651

4 Claims. (Cl. 257—108)

This invention relates to a milk pasteurizer and particularly to a small size family unit adapted for home use. While pasteurizers for large installations, such as dairies, are well known, effective and economical pasteurizers for home use have thus far not been available.

Pasteurizers for home use have been the subject of considerable study on the part of various state and federal health agencies. Because of the potential dangers inherent in improper pasteurization, such agencies have assumed the responsibility of testing many pasteurizers available on the market. The so-called phosphatase test for pasteurization is extremely sensitive and has proven the necessity for careful pasteurizer design if a pasteurizer is to win approval by the various health agencies. Thus as an example, it has been determined that a wet pasteurizing temperature is effective where a dry higher-than-pasteurizing temperature may not be effective on parts of the pasteurizer.

Thus many pasteurizers have failed to win approval because certain parts or surfaces contacting the milk are not properly heated during pasteurization.

In addition to the above requirement, it is essential that a pasteurizer be simple, rugged, be easily operated and handled and be capable of sterilization. Also a pasteurizer should be cheap to manufacture and to tool-up for.

The structure to be hereinafter described fulfills the above requirements to a high degree and provides a simple, economical structure which is effective for pasteurizing and which meets the rigid requirements and standards established by various governmental health agencies. In many prior art devices, which might have been practical, the entire inside surface of the milk container has not been raised to the pasteurizing temperature with the result that certain portions, such as the rim of the milk container, have shown an undesirable phosphatase reaction.

The invention to be hereinafter described provides an outer pail for holding water and in which is disposed a suitable electric heating element. Disposed within the outer pail is an inner pail for holding milk to be pasteurized. This inner pail is a simple cylindrical pail which normally sets in a water-bath at pasteurizing temperature. Covering the top of the outer pail is a motor assembly including a vertically reciprocable stirrer which is adapted to agitate the milk for proper mixing during pasteurization. In order to insure thorough pasteurization of the entire milk contents and elevation of temperature of the entire milk container to pasteurizing temperature, this invention provides a flexible cover for the inner container with water above the same. This cover has a clearance opening through which the vertically reciprocable stirrer passes. The clearance between the stirrer and cover is ample for the purposes required and in order to prevent water from entering the inner container, the cover is provided with a vertically extending collar portion which is higher than any possible water level. In practice, the milk will not reach the top portion of the rubber collar.

At the conclusion of the pasteurizing operation the milk may be chilled and the motor assembly lifted free and clear of the two containers. The inner container, together with its flexible cover, may then be removed. It will be found that every portion of this container and flexible cover which contacts the milk has been wet heated to pasteurizing temperature so that the entire device can pass the test required and meet established standards.

Figure 4:
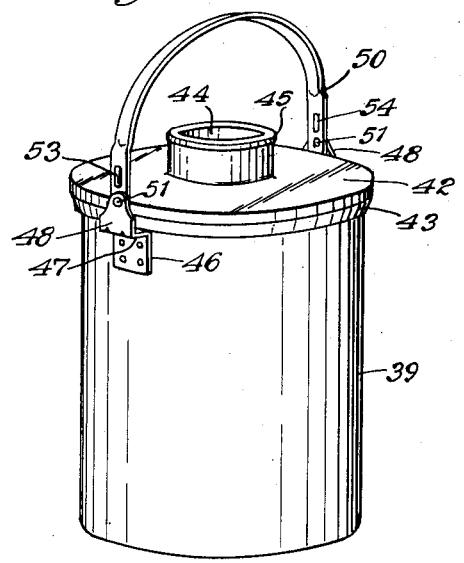
Figure 5:
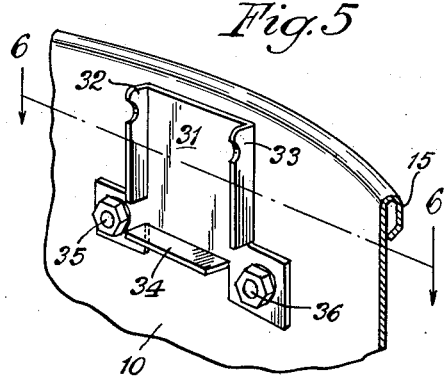

In order that the invention may be understood, it will now be explained in connection with the drawings wherein Figure 1 shows a sectional elevation of a pasteurizer embodying the present invention. Figure 2 is a sectional detail on line 2—2 of Figure 1. Figure 3 is a section on line 3—3 of Figure 1. Figure 4 is a perspective view of the milk containing portion of the pasteurizer. Figure 5 is a perspective detail of one of the two milk container support brackets and Figure 6 is a sectional detail of 6—6 of Figure 5.

A pasteurizer embodying the invention includes outer container or pail 10 made of suitable material such as stainless steel. Pail 10 is a preferably cylindrical with bottom 11 provided with bumps 12 for ease in sliding the container on a floor. Container 10 has rolled rim or edge 15 at the top thereof. Formed in the side of container 10 somewhat below edge 15 is outlet 17 having a suitable nipple to which rubber hose 18 may be attached. Container 10 also has formed therein at a point close to beaded edge 15 overflow slot 20. Any desired number of such slots may be provided, these slots serving to permit water to overflow and determine a maximum water level. Preferably however, the size of overflow slot 20 is made small so that a small quantity of water will escape.

Bolted to one side of container 10 is control casing 22 in which may be disposed an electric timer and other accessories necessary for the pasteurizer including switch knob 23. Control casing 22 carries at its bottom heating element 25 which extends into container 10 through a suitable slot in the container wall. This heating element extends over the bottom. Thermostat cartridge 27 also extends into the container from casing 22 and is adapted to control the circuit for the heating element so as to maintain a substantially constant temperature water-bath.

Pail 10 has at least two brackets for supporting the inner container, said two brackets as shown in Figures 3 and 5 being attached to the container near the top thereof and at diametrically spaced points. Since the two brackets are similar, only one will be described in detail. Thus referring to Figures 5 and 6, irregularly shaped plate 31 having notched sides 32 and 33 and bottom flange 34 is attached to the container near the rim thereof by bolts 35 and 36. Co-operating with these brackets are members on the inner pail or container to be described later.

Resting within container 10 is milk pail 39 of any suitable material preferably metal, such as stainless steel or the like. Container or pail 39 may be formed as a simple cylindrical pail having bottom 40 and is adapted to be positioned as shown in Figure 1 with bottom 40 spaced somewhat above electric heating element 25. Milk pail 39 has beaded edge 41 over which may be fitted rubber or other flexible cap 42 having molded edge 43. As shown in Figure 1, molded edge 43 fits over beaded edge 41 of the pail and is adapted to hug the pail rather tightly. Cap 42 has the inner portion thereof shaped to provide up-standing collar 44 terminating in edge 45.

Cap 42 may be of metal and need not necessarily be as flexible as rubber. Milk pail 39 has portions cooperating with the pail-supporting brackets carried by outer pail 10. Thus referring to Figure 4 specifically, milk pail 39 has Z-shaped clips 46 attached to the milk container by any suitable means, such as rivets. Each clip has outwardly extending portion 47 and upwardly extending portion 48 to which is attached bail or handle 50. Handle 50 extends from one clip to the other clip on the other side of the pail. Handle 50 is pivotally secured to portion 48 by means of pin or rivet 51 and immediately above the pivot point on the bail or handle are raised or embossed portions 53 and 54, these being on opposite ends of the handle.

As is evident from Figures 2 and 3, outwardly extending portion 47 on the milk pail is adapted to rest upon flange 34 and be supported thereby. Upwardly extending portion 48 normally rests between bent portions 32 and 33 of the bracket while boss 53 or 54, as the case may be, of the handle will spring into the semi-circular slot in portions 32 and 33 when the handle is bent down. Thus, when the handle is forced down generally flush with the top of the pail the milk container will be locked into position within the outer pail containing the water-bath.

Resting loosely on top of rim 15 of outer pail 10 is an assembly generally indicated by numeral 60. Assembly 60 comprises base 61 of stainless steel, or the like, having annular flange 62 and outwardly extending rim portion 63 with depending skirt 64 having beaded edge 65. Outwardly extending portion 63 is dimensioned so as to rest upon beaded rim 15 of pail 10. Engaging the base at flange 62 is dome-shaped cover 64. Above base 61 and within cover 64 is a solenoid-type motor generally indicated by numeral 66 and consisting of solenoid 67 with plunger 68 disposed within the solenoid. Plunger 68 carries armature 69 at the upper end thereof and at the lower end thereof has coil spring 70 extending within the bore of the solenoid and wedged between the bottom of armature 69 and the bottom of the solenoid. A suitable rocking means 72 operated by the armature cooperates with mercury switch 73 to oscillate the armature.

Thus the parts are so arranged that when the solenoid has reached its attracted downward position the circuit is broken and spring 70 raises the armature. The armature is continuously oscillated vertically. The mechanism for accomplishing this is more fully disclosed and claimed in the copending application of Elmer K. Malme, Serial No. 684,159 filed July 17, 1946, now Patent 2,513,577, granted July 4, 1950. Other means for oscillating the plunger may be used.

Plunger 68 has rod 74 detachably secured thereto. Rod 74 extends through bearing 75 in base plate 61, this bearing preferably being made of nylon. Rod 74 is long enough so that it extends well down within milk pail 40. At the bottom of the rod there is mounted disc 78. The rod length is so selected that at the bottom of the stroke, disc 78 will clear bottom 40 of the milk container. The length of the stroke and size of disc 78 are so selected that a gentle agitating action of milk results.

In practice, milk may be put into pail 39 up to some distance below the rim level. By proper design, the milk in the container will be agitated gently but not violently enough to cause any milk to be thrown up within collar 44 of the rubber cover. Rod 74 carries small disc 79 just below bearing 75 and this disc shields the bearing from any milk drops, particuarly when the motor assembly is removed and laid on its side. The rod and discs may be readily sterilized.

Motor assembly 60 is provided with handle 80 looped around the same. At the top of cover 64, nut 81 cooperating with a suitable bolt within the cover is provided for securing the handle in place. Handle 80 extends down along the side of flaring portion 64 and is rigidly attached to the side of the cover at both ends. At one end of the handle, the metal, forming base 61, is apertured to provide opening 83.

The pasteurizer is used as follows: Assuming that milk is in the inner pail and the two pails are locked together, the cap is fitted and motor assembly positioned. Water is supplied to the outer pail either through pipe 18 or through hose 84 inserted through the cover at aperture 83. Outlet 17 is closed, as by a stopper, and the water level allowed to reach overflow slot 20. The switch and timer are now turned on. The heating element raises the water temperature to a predetermined value while the rod is being reciprocated in the milk. The timer cuts off the heating element after a predetermined time. A suitable signal such as a lamp or buzzer may signal this. The milk is now ready for chilling. This may be done by running cold water through hose 84 and allowing hot water to run from outlet 17. It is preferred to continue agitator operation during cooling. By having hose 84 extend to the bottom of the outer pair, cold water will drive out the hot water and permit rapid chilling.

It is understood that the pasteurizer is so designed that in the normal locked position of milk container 38 overflow slot 20 will be high enough to permit water to extend above the rubber cap. Collar edge 45 of rubber cap is normally clear of base 61 of the motor assembly. Thus the entire milk handling unit consisting of pail and rubber cap may be sterilized before pasteurization and will be sterilized during pasteurization by contact with hot water. The same applies to rod 14 which may be detached and sterilized prior to pasteurization.

What is claimed is:

1. A pasteurizer for home use adapted to maintain wet heat on substantially all surfaces contacted by milk, said pasteurizer comprising an outer pail having a rim, an inner pail having a rim with the inner pail depth being substantially less than the outer pail depth, means for supporting the inner pail within the outer pail so that said inner pail is spaced from all the walls of the outer pail and with the inner pail rim lying below the level of the outer pail rim, a cover for the inner pail secured around the rim thereof, said cover having a central aperture and an upwardly extending collar defining said aperture, said collar being sufficiently tall so that the free collar edge is above the level of the outer pail rim, said outer and inner pails being adapted to contain water and milk respectively, a generally dome-shaped housing including a bottom cover plate, said cover plate having a flange shaped to slip over the outer pail rim, an electric motor in said housing, a rod depending centrally of said cover plate and passing through the apertured part of said inner pail cover and extending well down into said inner pail, agitating means carried by said rod, means for driving said rod from said motor for agitating the milk, said housing completely covering the top of said outer pail, means for maintaining water within said outer pail at a level above the inner pail cover and below the outer pail rim and means for heating the water in said outer pail.

2. The structure according to claim 1, wherein said cover for said inner pail is of rubber.

3. The structure according to claim 2, wherein said inner pail has a beaded edge around the outside of the rim so that said rubber cover may remain in position.

4. The structure according to claim 1, wherein the means for maintaining a constant water level includes apertures in the outer pail near the rim thereof and wherein said cover is of rubber.

HENRY B. SAUNDERS.

REFERENCES CITED

The following references are of record in the file of this patent:

UNITED STATES PATENTS

| Number | Name | Date |
|---|---|---|
| 1,152,308 | Evans | Aug. 31, 1915 |
| 1,201,082 | Nussbaumer | Oct. 10, 1916 |
| 1,401,090 | Levy | Dec. 20, 1921 |
| 1,648,725 | Endicott | Nov. 8, 1927 |
| 1,733,261 | Higby et al. | Oct. 29, 1929 |
| 1,850,500 | Goble | Mar. 22, 1932 |
| 1,925,877 | Mitchum | Sept. 5, 1933 |
| 1,979,706 | Reamy | Nov. 6, 1934 |
| 2,006,299 | Kaestner | June 25, 1935 |
| 2,325,434 | Stiles | July 27, 1943 |
| 2,513,577 | Malme | July 14, 1950 |